United States Patent [19]

Hiss

[11] 4,060,904
[45] Dec. 6, 1977

[54] MEASURING ASSEMBLY FOR TURBINE THRUST BEARINGS

[76] Inventor: William K. Hiss, 7101 Belair Road, Baltimore, Md. 21206

[21] Appl. No.: 699,434

[22] Filed: June 24, 1976

[51] Int. Cl.² ............................................. G01B 3/22
[52] U.S. Cl. .............................. 33/172 R; 33/174 R
[58] Field of Search ............ 33/172 R, 169 R, 169 B, 33/174 R, 174 Q, 178 R, 178 B, 147 R, 174 E

[56] References Cited

U.S. PATENT DOCUMENTS

| 1,647,552 | 11/1927 | Tangring | 33/172 R |
| 1,876,280 | 9/1932 | Dunn | 33/172 R |

Primary Examiner—Richard E. Aegerter
Assistant Examiner—Willis Little
Attorney, Agent, or Firm—J. Wesley Everett

[57] ABSTRACT

An assembly, or device, for measuring the end play in the bearing of a turbine hub of a torque converter in which the turbine hub is provided with a bore therethrough and the turbine is enclosed within a casing, the casing being provided with a single opening in one side thereof having a hollow hub extending outwardly from and about said casing opening, the axis of the opening in the casing hub being in alignment with the bore in the turbine hub, the measuring assembly or device being provided with a base portion having a flat upper surface, and an under surface parallel with the upper surface, the base being provided with an aperture whose side wall extends upwardly from the upper surface of the base, a spindle slideable through the aperture in the base and of such length as to extend through the hollow hub of the casing and in engagement with the bore in the turbine hub for moving the turbine in the measuring operation, the means engaging the turbine bore being of cone shape and extending outwardly from the spindle, the smaller end of the cone adapted to extend into the bore and the larger end of the cone adapted to engage the outer peripheral edge of the bore, the spindle further being provided with means for measuring the movement of the spindle after the upper end of the spindle is in contact with the bore of the turbine hub, means being provided for releasably fixing a measuring gauge to the spindle below the under surface of the base and means connected with the gauge for engaging the under surface of the base for operating the gauge when the spindle is moved relative to the base.

3 Claims, 5 Drawing Figures

MEASURING ASSEMBLY FOR TURBINE THRUST BEARINGS

The present invention relates to an assembly or device for measuring the end play in thrust bearings of a turbine of an automatic liquid torque converter.

The primary object of the invention is to provide an assembly having means for supporting the casing on its hollow hub and means extending through the hollow hub of the casing to engage the bore of the turbine hub positioned within the casing, wherein the end play in the turbine bearing may be measured within the casing.

Another object of the invention is to provide means for engaging a plurality of hub bores of different sizes.

A further object of the invention is to provide means for directly reading the end play between the thrust bearings of the turbine.

While several objects of the invention have been pointed out, other specific uses and advantages will be apparent as the nature of the invention is more fully described in the following detailed description with reference to the accompanying drawings, in which.

In reference to the drawings, like reference characters are used to designate like and similar parts throughout the several views.

Figures 1, 2, 5:
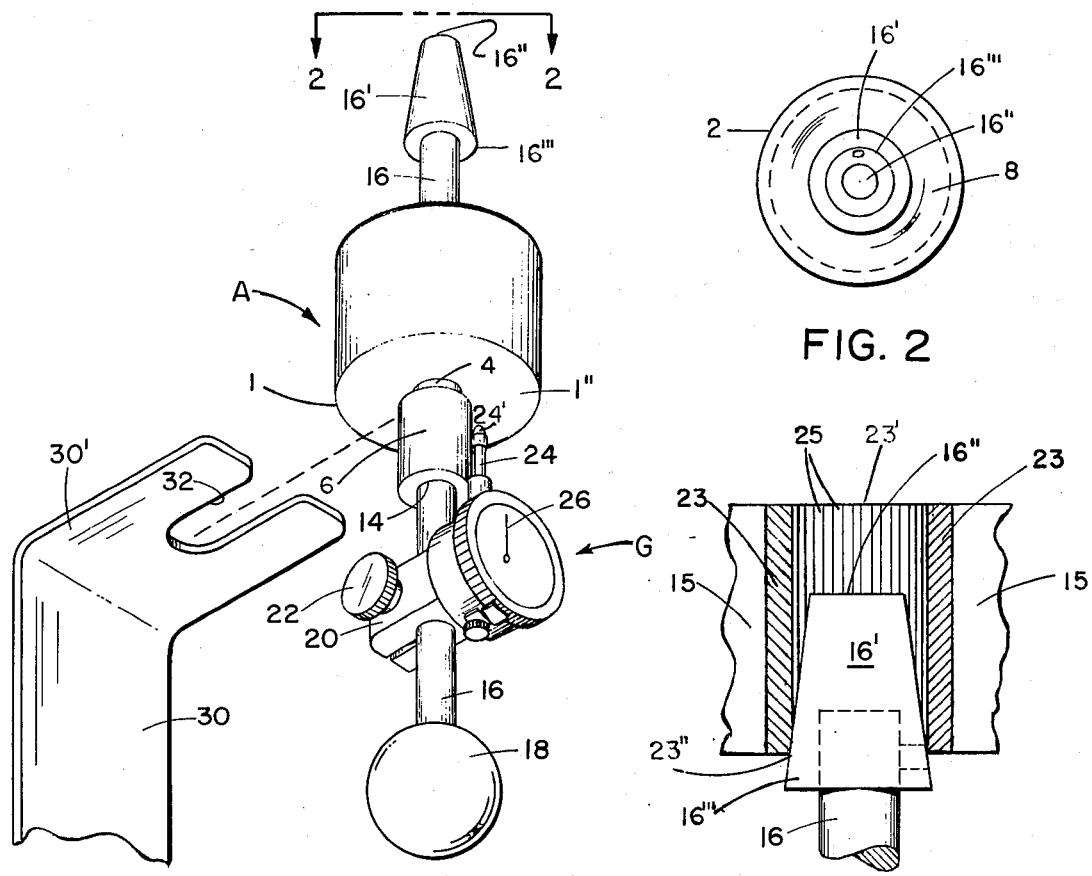
FIG. 1 is a perspective view of the measuring assembly.
FIG. 2 is a top plan view of the measuring assembly.
FIG. 5 is an enlarged fragmentary sectional view showing more in detail the turbine hub.

The measuring assembly A is provided with means to support an automatic liquid torque converter B. The torque converter is provided with a casing B' having an opening in one side thereof and a hollow hub 10 surrounding the opening and hermetically secured to the casing for supporting the casing when the torque converter is in normal operation. Inside the casing are a plurality of fins 19 fixed to the inside wall thereof; also within the casing is a turbine C, rotatable relative to the casing, having a plurality of fins 15 fixed about a central bored hub 23 having a plurality of grooves 25 about its inside surface in which a splined drive shaft is inserted therein when the torque converter is in operation.

Figures 3, 4:
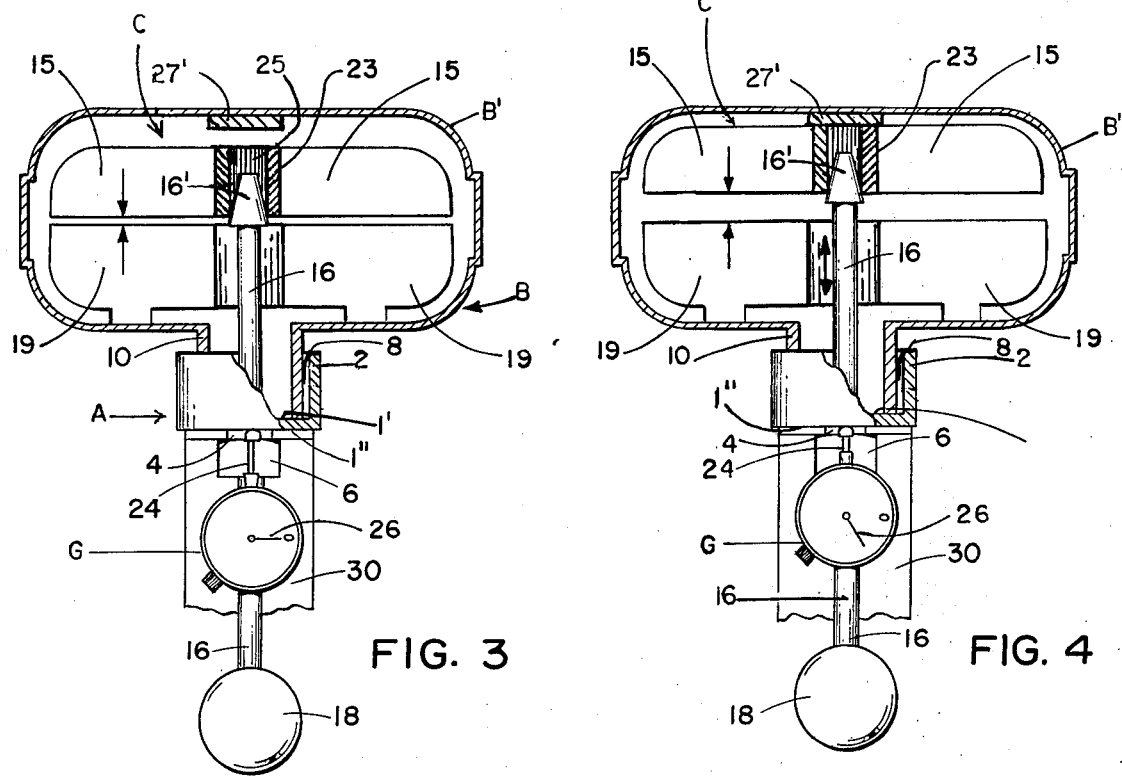
FIG. 3 is a diagrammatic view partly in elevation and partly in section showing the turbine in one position within the casing.
FIG. 4 is a view similar to FIG. 3 showing the turbine in another position.

The measuring assembly comprises a base 1 for receiving the hub 10 of the casing, as shown in FIGS. 3 and 4. The base is provided with a flat upper surface 1' having a side wall 2 extending upwardly from the periphery of the upper surface of the base to form a recess for receiving the hollow hub 10 of the casing.

The under surface 1" of the base is in a plane substantially parallel with the upper surface of the base 1'.

Below the under surface 1" of the base is a neck 4 of lesser diameter than the base 1 and outwardly from the neck portion 4 is a portion of greater diameter than the neck portion 4.

Attached to the inner side wall 2 of the recess and adjacent the top thereof is a flexible diaphragm 8, such as rubber or the like, having a central opening of such size as to be slideably adjustable over various size hubs, carried by the casing of the torque converter.

Positioned centrally of the base and perpendicular thereto is an aperture 14 which extends through the base, the neck 4 and the element 6. Slideable through this aperture is a spindle 16. The lower end of the spindle is provided with a knob 18 for easy manual manipulation of the spindle.

slideable along the spindle 16 and below the element 6 is an adjustable bracket 20 which is releasably fixable to the spindle 16 by a thumb screw 22.

Fixed to the bracket 20 is a standard measuring gauge G having a stem 24 extending parallel with the spindle 16 and in the direction of the underside 1" of the base for operating the gauge.

When the outer end of the hub 10 of the casing B is resting on the upper surface 1' of the base 1 the spindle 16 is moved manually upwardly through the hollow hub 10 to engage the bore 23' in the turbine hub 23 as shown in FIGS. 3, 4 and 5.

Fixed to the upper end of the spindle 16 is a member 16' shaped in the form of an inverted cone with its smaller end extending outwardly from the spindle adapted to extend into the bore 23' of the turbine hub 23, while the larger end 16''' of the cone is adapted to engage the peripheral edge 23" of the bore in order to adjust to a variety of sized openings of bores carried by the turbine hubs, the larger end of the cone being adjacent the spindle and always of a diameter greater than the opening in the turbine hub.

The assembly is preferably supported on a support 30 having an angle portion 30' and a slot 32 adapted to engage the neck portion 4 between the bottom surface 1" of the base and the member 6. However, the assembly, or device, may be supported in most any suitable position as long as the spindle is in substantially a vertical plane.

The measuring device is put in operation in the following manner. The support 30 is formed and located in any desirable place with the portion 30' extending in substantially a horizontal plane. The slot 32 of the support 30 is moved to engage the neck 4 between the under surface 1" of the base and the member 6. The thumb screw 32 is released and the bracket 20 mounted on the spindle 16 is moved downwardly on the spindle 16 adjacent the knob 18.

At this point the outer end of the hub 10 of the casing of the torque converter is placed in the recess formed by the wall 2 on the upper surface 1' of the base member 1. When the hub 10 of the casing is placed within the recess it is centered by the pliable diaphragm member 8 attached to the inner surface of the side wall 2.

After the torque converter casing B is placed on the upper surface 1' of the base 1 the spindle is moved upwardly through the opening in the base and the hollow casing hub 10 until the cone-shaped upper end member 16' comes in contact with the bore 23' of the hub 23 of the turbine, after which the bracket 20 is moved up the spindle 16 until the upper end 24' of the stem 24 is in light contact with the bottom surface 1" of the base 1, and the hand 26 of the gauge G stands at zero when the thumb screw 22 is tightened to fix the location of the bracket 20 on the spindle.

It will be noted that one side of the turbine hub will move toward the lower thrust bearing by the action of gravity.

An upper movement of the spindle 16 will raise the turbine until the opposite thrust bearing 27' is contacted by the turbine hub 10. This movement (if any) is generally referred to as the end play between the thrust bearings of the turbine and must not be more than a predetermined distance for the proper operation of the torque converter. This end play is measured normally in thousandths of an inch on the gauge G. If the end play shown by the hand 26 of the gauge is more than that prescribed, new bearings will be recommended for the proper performance of the torque converter, or a new torque converter may be needed.

While the invention has been described and illustrated in detail, other similar elements may be incorporated and still be within the scope of the appended claims.

I claim:

1. In a transmission torque converter comprising a casing having an opening therein, a bearing supporting a turbine having a central bore therethrough carried within said casing, and a hollow hub fixed about said casing opening of a larger diameter than the turbine bore and having at least its outer surface perpendicular and on the same axis as said turbine bore, an assembly for measuring the end play of said bearing, said assembly comprising:

a. a base having parallel upper and lower surfaces, each of said surfaces being in a single parallel plane, the upper surface of the base being adapted to receive the outer end of the casing supporting hub, means for supporting the base in a substantially horizontal plane, said base having an aperture extending therethrough, the walls of the aperture being substantially perpendicular to at least the upper surface of the base;
 b. a spindle of smaller diameter than the diameter of the hollow hub and adapted to slide through said aperture in the base;
 c. the upper end of the spindle being cone-shaped and tapered inwardly toward its outer upper end adapted to engage one end of the said turbine bore;
 d. a gauge-supporting bracket having an aperture therethrough adapted to normally slide along said spindle and positionable on said spindle below the base, said bracket having means for releasably fixing the bracket to the spindle at selected locations;
 e. a measuring gauge fixedly supported upon said gauge-supporting bracket having operatable means adapted to engage the underside of the said base for operating the same for measuring the movement of the spindle through the aperture in the base, whereby the end play in the turbine bearing may be recorded on the gauge upon the upward movement of the spindle after its upper end has been placed in contact with the hub bore of the turbine.

2. An assembly as claimed in claim 1 wherein the upper surface of the base is provided with a side wall extending upwardly from the upper surface of the base and of greater diameter than the casing hub.

3. An assembly as claimed in claim 1 wherein a pliable apertured bushing is fixed to the inner surface of the side wall adapted to engage the outer side surface of the casing hub for centering the casing hub relative to the said side wall.

* * * * *